Patented Mar. 15, 1938

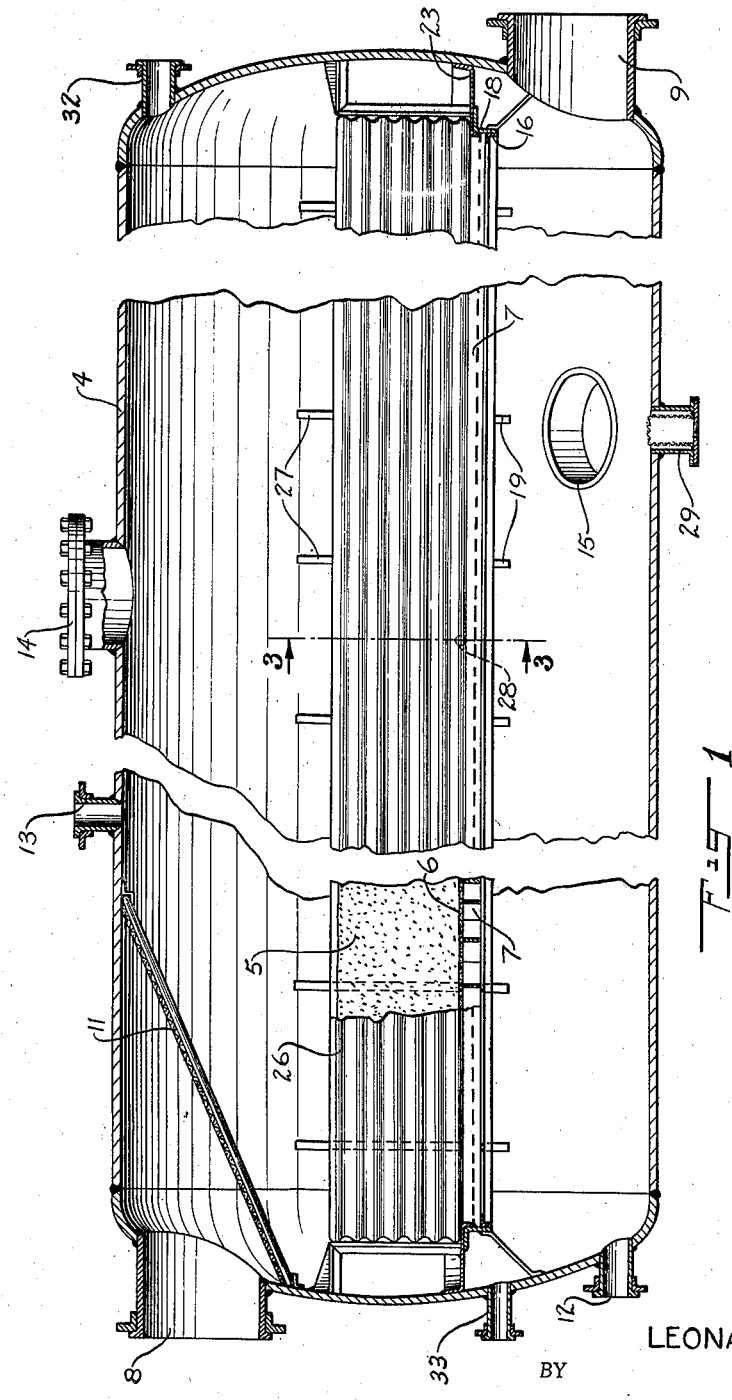

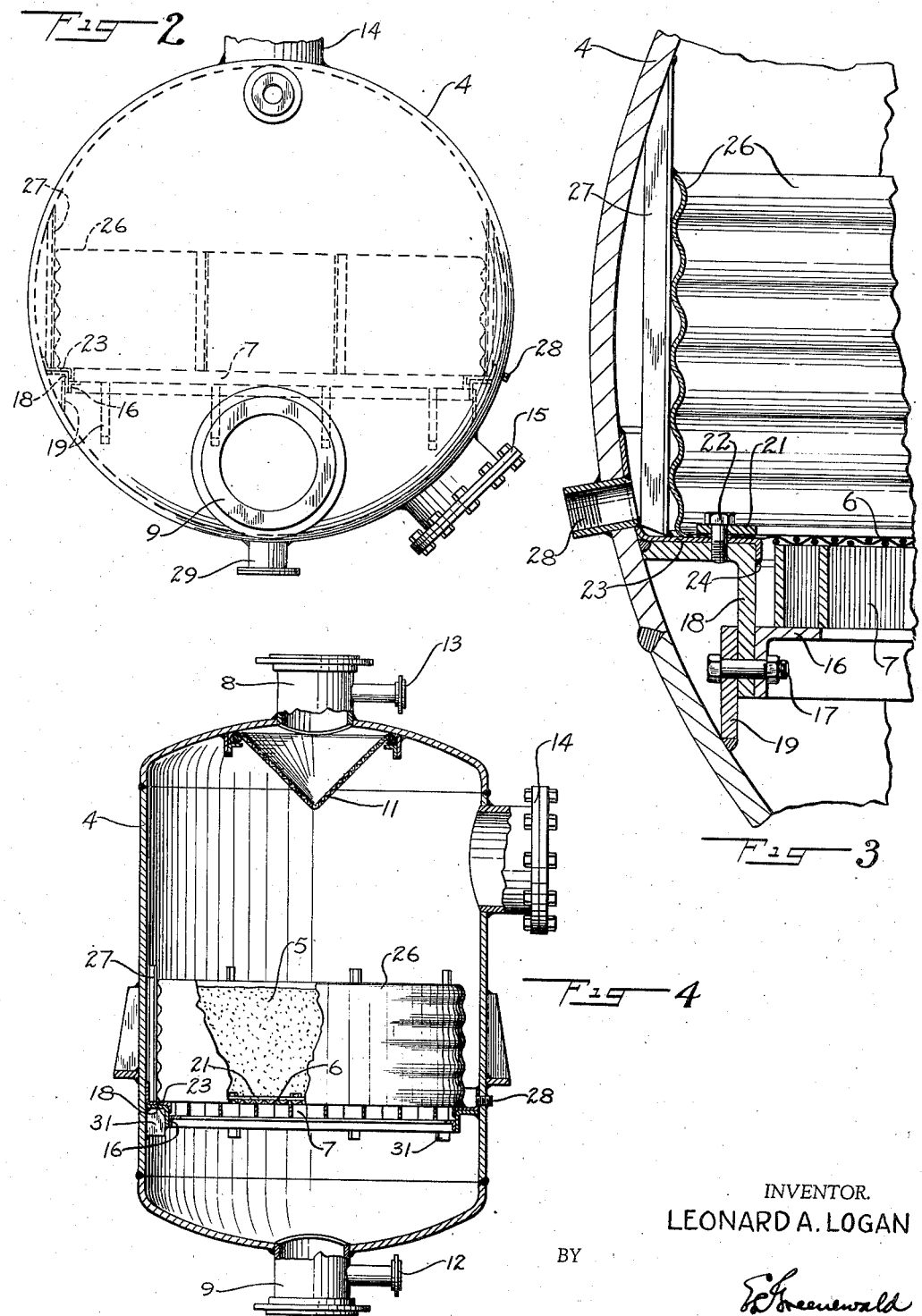

2,111,218

UNITED STATES PATENT OFFICE 2,111,218

ADSORPTION APPARATUS

Leonard A. Logan, New York, N. Y., assignor, by mesne assignments, to Union Carbide and Carbon Corporation, a corporation of New York Application December 29, 1934, Serial No. 759,709

7 Claims. (Cl. 183—49)

The invention relates to improved apparatus and equipment primarily for use in the art of recovering solvents or other vapors from mixtures thereof with other gases, by means of a solid adsorbent material. It has particular reference to a novel adsorber construction, of an arrangement especially adapted for use with activated carbon as the adsorbent material.

A type of adsorber apparatus now in quite common use consists of a steel tank or other vessel, usually cylindrical in shape, provided with supporting means therein of a foraminous nature for holding a layer or bed of solid adsorbent material. The adsorbent bed, and the containing vessel, may be adapted for use in either a vertical or horizontal position, but, in either instance, the adsorbent is disposed so as to form a continuous partition within the vessel, through which gases traversing the adsorber are forced to pass. This arrangement is usually effected by carrying the outer surfaces of the adsorbent bed to a point in direct contact with the inner walls of the container or supporting members integral therewith. Definite disadvantages have been found in this type of adsorber, especially when the adsorbing medium employed is one whose adsorptive capacity may be adversely affected by the presence of moisture, or where there is a tendency toward excessive corrosion at the portion of the adsorber shell in contact with the adsorbent.

It is customary to remove adsorbed vapors from activated carbon by heating the adsorbent directly with steam. With a steel adsorber large quantities of this steam condense on the inner walls of the tank, and in the structure above described, the water formed flows down the walls of the adsorber into the adsorbent bed, where a large portion of it is retained about the entire outer edge of the adsorbent. This is detrimental to the effectiveness of the adsorbent bed as a whole. It is known, for example, that the amount of solvent which may be adsorbed by activated carbon with 100% efficiency (commonly referred to as the "breakpoint" of the carbon) is inversely proportional to the amount of moisture held by the carbon at the start of the adsorption process, and this effect becomes more pronounced as the service life, porosity, and consequent water adsorbing capacity of the carbon increases. It is also true that the effective breakpoint of an entire carbon bed is no more than that at its weakest point, and a difference in moisture content between the edges and center of the carbon of as little as 5%, has been shown to decrease, by 3.2% of its weight, the effective adsorptive capacity of the entire carbon bed. The desirability of avoiding segregation of moisture in any portion of the adsorbent bed is thus quite evident. In addition to this disadvantage, excess corrosion is also usually encountered at places in the adsorber shell adjacent to the carbon, and complete deterioration of portions of the adsorber wall has resulted after a comparatively short service life.

It is the primary object of my invention to avoid the aforementioned difficulties, commonly encountered in prior adsorption apparatus, and to provide an improved adsorber construction, in which the solid adsorbent medium is maintained more uniformly effective in adsorption capacity throughout the entire body thereof, with a resulting unit of greater dependability and efficiency in operation. It is a further object to provide a structure in which internal corrosion of the adsorber shell is greatly reduced, if not entirely avoided.

The essential advantages of the invention are derived from the particular manner of placing and supporting the solid adsorbent within the adsorber. As a container vessel, the usual cylindrical metal tank is suitable, but within the tank I propose to build a false wall or barrier of light metal, adapted to confine the adsorbent material in a position spaced on all sides from the inner surfaces of the tank, and resembling, in conjunction with the bottom adsorbent support member, a large suspended metal basket. The retainer or barrier wall is of a low heat capacity, so that it may be readily and quickly raised to steam temperature with very little steam condensation. Condensate forming on the adsorber tank walls is collected between the light retainer wall and the tank surface, and may be drained off through a trap, without contacting any portion of the adsorbent material. Supporting members for the complete adsorber basket are, of course, so arranged that gases entering and traversing the adsorber are confined to a passage leading through and in direct contact with the adsorbent material.

Other features and advantages of the invention will be more fully evident from a description of the accompanying drawings, showing one modification of the invention as applied to an activated carbon adsorber.

In the drawings, Fig. 1 is a horizontal elevation of a cylindrical adsorber embodying the invention;

Fig. 2 is a right end view of the same adsorber;

Fig. 3 is a section on the line 3—3 of Fig. 1; and

Fig. 4 shows a substantially similar embodiment of the invention as applied to a vertical type cylindrical adsorber.

Referring first to Figures 1, 2 and 3, a heavy metal cylindrical shell 4 serves as the container vessel, and is adapted for use in a horizontal position. Centrally disposed within the cylinder, and dividing it into separate upper and lower gas spaces, is the layer or bed of activated carbon 5. A foraminous base support for the adsorbent carbon, consists of a wire mesh screen, or other perforated or porous member 6, backed by a metal grating 7, thus permitting passage of gas directly through a carbon bed. The air-solvent mixture, or other gases to be treated, enters the adsorber through inlet 8, and the denuded air is taken off through the exit 9. A screen or perforated plate 11, placed at the angle shown, is adapted to diffuse or more uniformly distribute the pressure of the incoming gas over the entire carbon bed. The steam inlet and outlet 12 and 13, respectively, permit direct heating of the carbon with steam to remove adsorbed material, and the manholes 14 and 15 provide means of access to the interior of the adsorber. The port 32 is provided for connection to a by-pass conduit between the upper and lower gas spaces of the adsorber, which is not shown in the drawings, and the opening 33 furnishes means for releasing or controlling the internal pressure on the adsorber.

The novel structure employed for supporting and positioning the adsorbent bed is shown in detail in Figure 3. The grating 7 rests at its lower outer edges on the steel angle 16, which in turn is supported through bolts 17, by another angle member 18, the latter being attached by a continuous weld at its upper end to the shell of the adsorber. Both the angles 16 and 18 are continuous about the sides and head of the container tank, and the steel bar support pieces 19, spaced at regular intervals and welded to the shell, act in conjunction therewith to form a rigid support structure. The complete outer edge of the wire mesh screen 6 overlaps the horizontal portion of the angle 18, where it is secured by a continuous flat bar 21 held in position by regularly spaced cap screws 22. The overlapping portion of the screen 6 is, at the same time, spaced from direct surface contact with the member 18 by means of a thin metal sheet or apron 23, having a short end portion thereof bent over the corner of the angle 18 and welded to the vertical side thereof, as shown at 24, and the opposite end extending up and welded to the inner surface of the tank shell. A thin corrugated metal wall 26, in a substantially vertical position completely surrounds the carbon bed, and confines the adsorbent in a position spaced from the walls of the containing vessel. As a stiffening means for this barrier wall, metal angles 27 are provided, which are spaced about the wall at equal intervals to the support bars 19. Water condensing on the inner tank walls above the lower level of the adsorbent flows into the space between the barrier wall 26 and the outer shell, where the apron 23 aids in forming a trough from which the water may be drained off through the opening 28. Another drain 29 carries water away from the lower part of the container cylinder.

The modification of Fig. 4 is in all essential respects substantially similar to the structure above described, and similar reference numerals are used to indicate corresponding parts. The cylindrical container 4 is, in this instance, adapted for use in the vertical position, and the adsorber basket is necessarily one of circular form, rather than the rectangular shape of Figure 1. Here also the barrier wall 26, and its bracing members 27, confine the adsorbent in spaced position from the outer cylinder walls, and condensed water flows down the inner walls of the tank out of contact completely with the carbon, and is drained off through opening 28. The angle member under support of the carbon bed is identical with Figure 3, with the exception that narrow plates 31, welded at intervals to the vertical cylinder shell, serve as a support on which the member 18 rests, replacing the support bars 19 of the horizontal type adsorber.

In both structures shown the barrier wall 26, and other members associated therewith in direct contact with the carbon bed, are preferably of a corrosion-resistant metal or alloy, such as copper, stainless steel, Monel metal, or the like. The wall is also of a light construction, and of low heat capacity, whereby it is quickly raised to steam temperatures with very little condensation on either its inner or outer surface. Wetting of the edges of the carbon bed, through condensation during the steaming process, is thus substantially avoided, and a carbon bed having a uniformly low water content throughout may be readily maintained. This imparts to the bed as a whole a more uniform and positive, as well as a more efficient, adsorptive capacity. Separation of the adsorbent from the container vessel, in this manner, also impedes any tendency toward a galvanic cell action between the carbon and the metal shell, and this together with the corrosion-resistant apron 23, lining the shell at the point where condensate collects, entirely avoids any serious corrosion of the shell adjacent to the adsorbent bed.

Modifications in the actual structures shown may be readily apparent to those skilled in the art, without departing from the spirit of my invention, and no limitations should be imposed thereon, other than as defined in the appended claims.

I claim:

1. In an adsorption apparatus comprising a container vessel having inlet and exit ports therein and a bed of solid adsorbent interposed between said ports within said vessel; a shell serving to confine said bed of solid adsorbent; mounting means for positioning said shell in spaced relation to the inner surface of said vessel, a foraminous support for said adsorbent secured to said mounting means, and an apron covering the portion of the inner surface of said vessel adjacent to the lower part of said shell, said apron extending inwardly over said mounting means and forming with the lower edge of said shell a trough for receiving condensate formed on the inner surface of said vessel.

2. Apparatus according to claim 1 in which said apron and said shell comprise corrosion-resistant light sheet metal.

3. Apparatus according to claim 1 wherein said apron is apertured to receive a drain.

4. In an adsorption apparatus comprising a container vessel having inlet and exit ports therein and a bed of solid adsorbent interposed between said ports within said vessel; continuous supporting means sealed with the wall of said vessel, a shell mounted upon and sealed with said means in spaced relation to the inner surface of said vessel and serving to confine said bed, a grating secured to said means beneath said shell, and a foraminous base supported by said grating and forming a bottom for said shell.

5. Apparatus according to claim 4 wherein said base is sealed about its edges to said supporting means.

6. An adsorption apparatus comprising a container vessel provided with gas inlet and exit ports, a shell for containing a bed of solid adsorbent mounted in a generally vertical position within said vessel and in spaced relation to the walls thereof, means extending from the walls of said vessel to said shell for sealing the space surrounding said shell whereby gases traversing the vessel must pass through the bed of solid adsorbent, a foraminous base secured to said sealing means forming a bottom for said shell, said vessel being provided with a steam exit port above said shell, and a steam inlet port beneath said base.

7. In an adsorption apparatus comprising a container vessel having inlet and exit ports therein, and a shell for confining a bed of solid adsorbent; a structural member sealed to and extending inwardly from the inner surface of said vessel and supporting said shell in spaced relation to the wall of said vessel, a grating detachably secured to said member and a foraminous base resting on said grating and being detachably secured to said member.

LEONARD A. LOGAN.